United States Patent [19]

Gehrmann

[11] Patent Number: 4,739,408
[45] Date of Patent: Apr. 19, 1988

[54] METHOD OF AUTOMATIC ALIGNMENT OF THE ELECTRON BEAM DIRECTION IN A TELEVISION CAMERA TUBE

[75] Inventor: Rainer Gehrmann, Alsbach-Hähnlein, Fed. Rep. of Germany

[73] Assignee: Robert Bosch GmbH, Stuttgart, Fed. Rep. of Germany

[21] Appl. No.: 937,878

[22] Filed: Dec. 4, 1986

[30] Foreign Application Priority Data

Dec. 5, 1985 [DE] Fed. Rep. of Germany ....... 3542973

[51] Int. Cl.⁴ .......................................... H04N 5/228
[52] U.S. Cl. .................................................. 358/217
[58] Field of Search ............... 358/217, 218, 222, 219; 250/213 VT

[56] References Cited

U.S. PATENT DOCUMENTS 3,710,018  1/1973  Ryley et al. ..................... 178/7.2

FOREIGN PATENT DOCUMENTS 0103451  9/1983  European Pat. Off. .
2039915  8/1969  Fed. Rep. of Germany .
8225702  9/1982  United Kingdom .

*Primary Examiner*—Jin F. Ng
*Assistant Examiner*—Stephen Brinich
*Attorney, Agent, or Firm*—Frishauf, Holtz, Goodman & Woodward

[57] ABSTRACT

The signal electrode of a television camera tube by first scanning in an odd-numbered picture field is focussed in horizontal scanning pattern and then superimposing thereon in an even-numbered picture field the scanning pattern offset out of interlace and rotated slightly while at the same time the focussing current for the focussing coil of the electron beam is slightly altered for the even-numbered picture field. Charge patterns with charge maxima are thereby produced in the unscanned zones. The actual alignment is determined by the focus pivot point F that lies in a strip of maximum charge values running obliquely across the scanning pattern. Increasing the focussing current produces, simultaneously, rotation to the left and enlargement of the scanning pattern, resulting in a maximum charge value strip running from upper left to lower right (patterns a, c and e). The reduction of the focussing current, on the other hand, produces rotation to the right and reduction of the scanning pattern size, which last is overcompensated by a supplemental vertical deflection magnitude correction to produce the same size pattern as the pattern rotated to the left when the focussing current was stronger. In this last case, the maximum charge strip runs from upper right to lower left and, as in the previous case, passes through the focus pivot point F. From the location of the point F an alignment correction value is produced and stored and used to correct the current in the alignment coils and the procedure is repeated until the desired alignment (pattens e and f) is obtained.

8 Claims, 2 Drawing Sheets

METHOD OF AUTOMATIC ALIGNMENT OF THE ELECTRON BEAM DIRECTION IN A TELEVISION CAMERA TUBE

This invention concerns automatic alignment of television camera electron beam direction by observing the scanning pattern of the electron beam when the signal electrode of the camera is illuminated with diffuse light while the beam focussing field is varied on a picture field by picture field basis, followed by adjustment of a directional alignment magnetic field of the camera tube for reducing the beam directional error.

BACKGROUND AND PRIOR ART

It can often happen, for example as the result of manufacturing tolerances in the production of television camera tubes and particularly their electron beam producing systems, that the undeflected electron beam drops centrally incident on the signal electrode of the camera tube. In consequence, the scanning pattern by which the video signal is generated will not be precisely centered on the signal electrode. For correction of this directional error of the electron beam, it is usual to produce mutually perpendicularly directed magnetic fields by means of so-called beam alignment coils disposed around the beam generation system. In order to obtain centering of the electron beam, the direct currents in the alignent coils must be correspondingly adjusted. An important requirement of such alignment is a measuring process for quantitative determination of the directional (alignment) error. Adjustment procedures heretofore used require evaluation of a test picture and one therefore of only most limited suitability for automating the alignment of television cameras.

There is known from German Published Patent Application (AS) No. 20 39 915 and U.S. Pat. No. 3,710,018 a television camera with a camera tube that has a beam alignment system as well as a focussing system such that the effect of the alignment error can be determined by changing the beam focussing field and right afterwards then the alignment coil field until the effects of these fields have produced an alignment error minimum. The field variation and following adjustment steps for precise axial alignment of the scanning beam is in this case automatically carried out. This known system, however, always requires a test picture and, moreover, is relatively expensive and complicated.

There is also known from European Patent No. 103,451 a method for alignment of the electron beam in television camera tubes in which the bias voltage of the signal electrode is so greatly reduced that a measurable shading effect takes place in the camera image. Then for axial alignment of the electron beam the amount of energy supplied to the alignment coils is varied until a measurable amount of such shading takes place in the camera tube. The energy for axial alignment of the electron beam supplied to the alignment coils is then changed until a minimum average shading is obtained. This known method has the disadvantage that complicated and expensive circuit operations are necessary for variation of the signal electrode voltage which, moreover, has a negative effect on the stability or immunity from disturbance on account of the additional parasitic capacitances.

SUMMARY OF THE INVENTION

It is an object of the present invention to provide a method of automatic alignment of the electron beam direction in a camera tube that makes recognition of the beam position plain without use of a test picture and which enables precise and quick correction of beam centering errors.

Briefly, the electron beam scanning of the signal electrode is varied from picture field to picture field in such a manner that as a result both of the scanning variation and the variation of the beam focussing magnetic field a variation is produced in charge accumulation configuration on a field to field basis, each of these charge configurations having charge maxima. The charge maxima of a plurality of successive picture fields make plain the centering error of the electron beam, so that on their basis the alignment coils of the picture tube can be adjusted to minimize the alignment error.

This method can be automatically operated both quickly and reliably and does not require a test picture.

It is convenient in this method to vary the scanning pattern by vertically offsetting alternate picture fields and thereby causing the scanning patterns of two successive fields to intersect each other. For the building up of charge maxima, it is desirable to blank the electron beam intermittently. This can be done by blanking an entire field at regular intervals, by blanking a line from time to time or by interrupting (blanking) the electron beam current in a number of line sections within the length of one line. In automatic operation, the charge maxima are measured, the measurement values derived therefrom are digitized, stored and then compared with a previously stored measurement value and from that comparison a positioning or adjustment value is derived and digitally stored, which is then converted into an analog signal value for adjusting the beam alignment and is supplied to the alignment coils.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
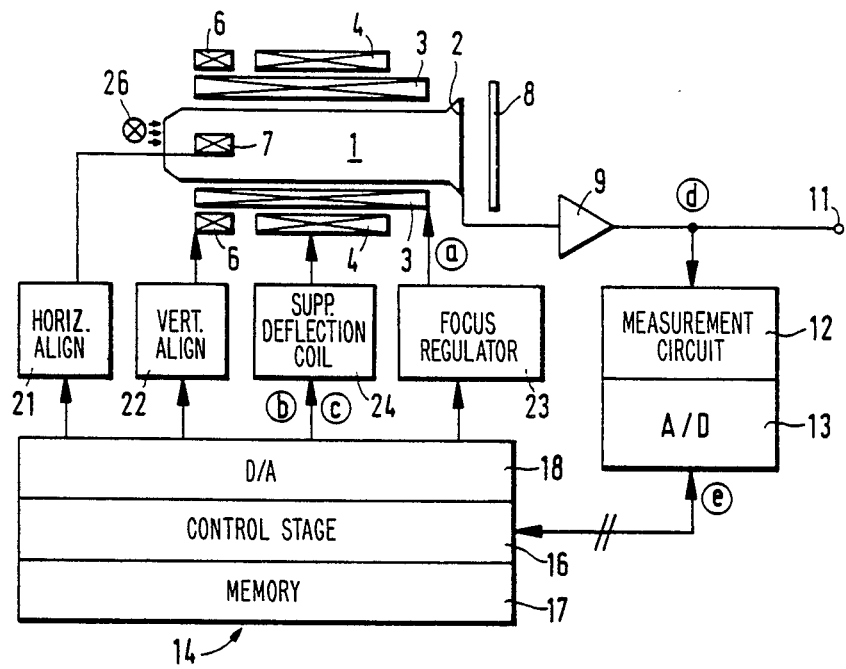
FIG. 1 is a circuit block diagram for carrying out the method of the invention.

In the circuit block diagram of FIG. 1, there are shown a television camera tube 1 having a signal electrode 2, a focussing coil 3, a vertical deflection coil 4 as well as vertical alignment coils 6 and horizontal alignment coils 7. Immediately in front of signal electrode 2 is a filter wheel 8 by means of which various gray filters can be swung into place to modify the picture producing light incident on the signal electrode. In one of the mountings of the filter wheel 8, an opaque disk is provided instead of the gray filter so that all incident light can be completely blocked off. An amplifier 9 is connected to the signal electrode 2 and serves to amplify the generated video signal. The amplified video signal is then made available at the output 11 for further processing.

A meaurement circuit 12 is provided for carrying out the alignment procedure of the invention, this measuring circuit being connected to the output of the amplifier 9. The measurement circuit 12 is connected with an analog-to-digital converter 13, at the output of which a digital measurement value can be obtained for processing in alignment control unit 14 for the progressively precise automatic adjustment of the beam alignment in accordance with the invention. The control unit 14 consists essentially of a control stage 16, a memory unit 17 as well as a digital-to-analog converter 18.

The digital measurement values obtained from the analog-to-digital converter 13 are compared in the control stage 16 with the values then present in the storage unit 17. From this comparison a new positioning value is derived and likewise stored. The new digital positioning value, after digital-to-analog conversion in the converter 18, is available as an analog positioning value for the horizontal beam alignment stage 21 and vertical beam alignment stage 22 connected to the converter, so that the alignment currents of the coils 7 and 6 are respectively controlled accordingly. This control or regulation, in accordance with the method of the invention, is carried out for minimizing the deviation of the axial beam.

Also connected to the control stage 16 is a focus regulator 23 for regulating the focussing current flowing in the coil 3 and also a supplementary deflection circuit 24 for modifying the vertical deflection current in the vertical deflection coil 4. Furthermore, a light source 26 is provided for the camera tube 1 which serves in a known way for biassed lighting of the signal electrode.

Figure 2:
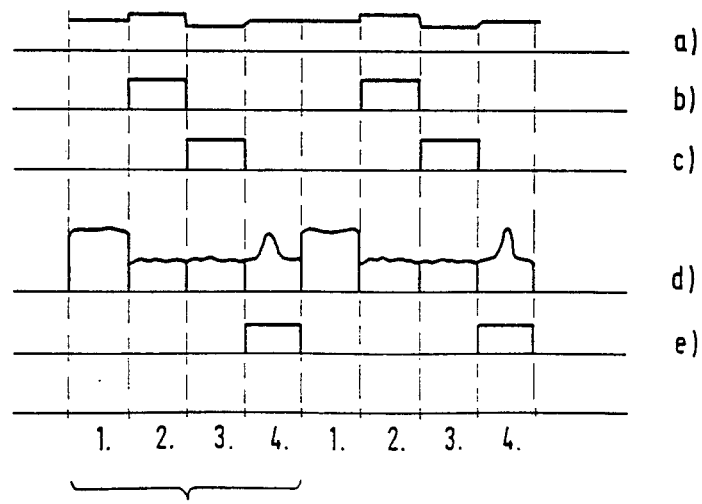
FIG. 2 shows a few of the signals that are present in the circuit of FIG. 1 during operation thereof.

The alignment method of the invention is now to be explained in more detail in connection with FIGS. 2 and 3. The reference numerals associated with the signals represented in FIG. 2 are drawn in FIG. 1 at the connection lines where such signals occur. During the entire alignment operation, the signal electrode 2 is illuminated with diffuse light which arrives either from outside through one of the gray filter disks to impinge on the signal electrode 2 or else (when the opaque disk is swung into place in front of the camera) from the light source 26 which is provided for biassed lighting of the signal electrode 2.

Then a certain charge pattern is produced on the signal electrode 2 by special scanning with the electron beam which is produced either by cyclical blanking of the camera tube within a television line or within one or more picture fields or by a shift of the scanning pattern of one field so as to pass over the scanning pattern of another field. At the same time the focussing condition of the beam is affected field by field by slightly changing the focussing current in the manner shown in line a of FIG. 2. The resulting rotation of the pattern and its diminution of magnification disturbs the straight-line charge structure that would otherwise form (see pattern diagrams in FIG. 3). In consequence, when reading these charge structures, there are additional modulations of the signal current. A conclusion can be drawn upon the focus center of rotation from the resulting charge structures on the signal electrode 2 which in the case of normal scanning can be read out of the video signal. This center of rotation is the center about which the mutually intersecting fields have been rotated (see F in FIG. 3). This pivot point is identical with the rest position of the electron beam when it is not being deflected. It is now to be brought to coincide with the picture center of the signal electrode 2. The recognition of this picture center point (without the presence of a test picture) can be carried out, for example, by scanning over the signal electrode 2 and detection of its edges.

Figure 3:
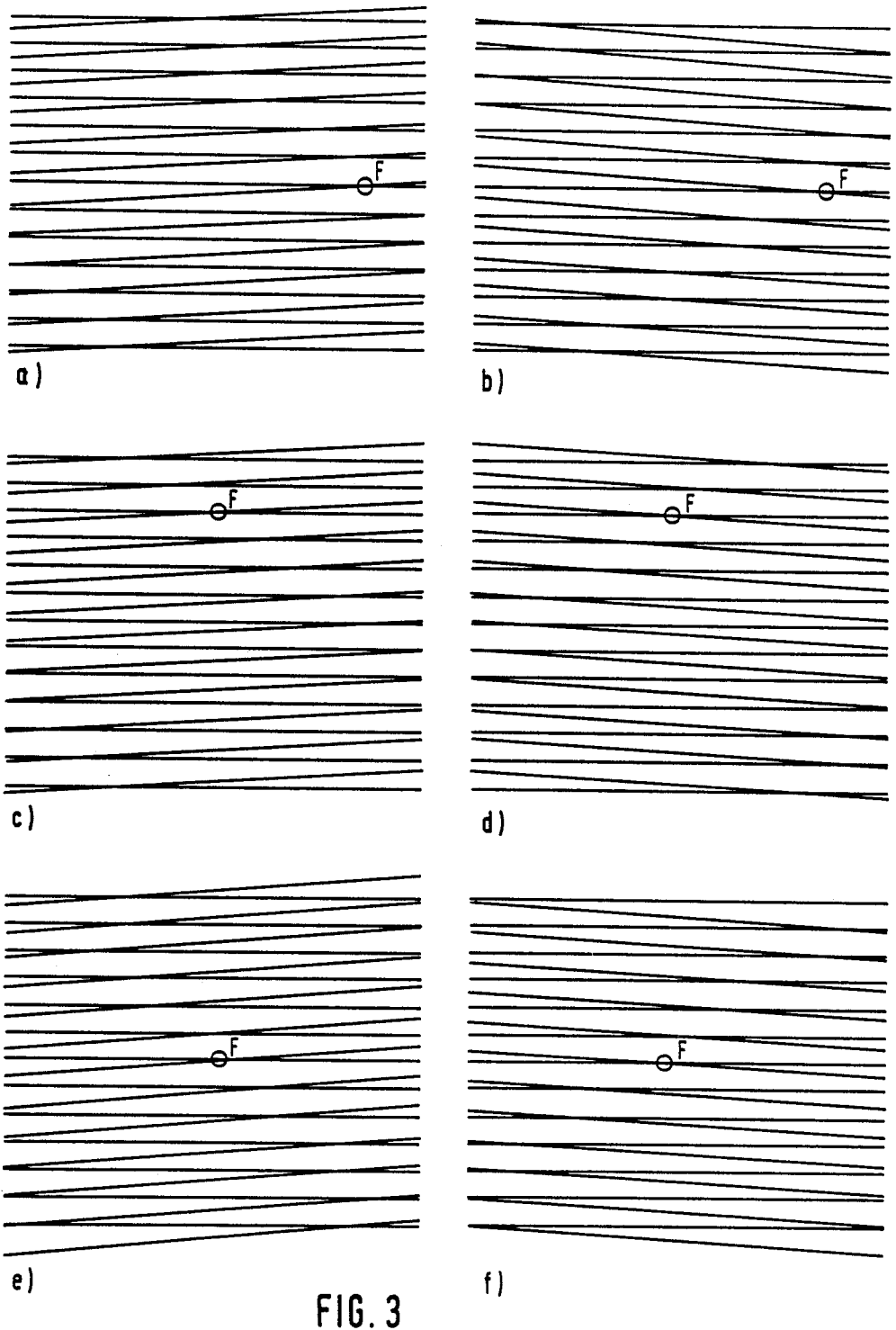
FIGS. 3A–3F show, in juxtaposition to each other for comparison, examples of scanning pattern portions to be evaluated in accordance with the method of the invention.

Pattern structures are shown in patterns a to f of FIG. 3 which would be produced if an optimally focussed horizontal scanning pattern of an odd-numbered field has superimposed on it the pattern of an even-numbered field which has been offset from its interlaced position, rotated and, at times, magnified. In these cases, there result charge configurations or structures having charge maxima in the unscanned zones which can be read out in a following scanning phase. The actual focus pivot point F then lies on a strip of maximum charge values running obliquely across the scanning pattern. The increase of the focussing current produces at the same time a left-hand rotation and magnification of the scanning pattern, which produces orientation of the maximum charge value strip from the upper left to the lower right (patterns a, c and e of FIG. 3). The reduction of the focussing current, on the contrary, produces a right-hand rotation and diminution of the scanning pattern. When this diminution is overcompensated by means of a supplemental vertical deflection magnitude correction, so that again a magnification of the pattern results, the maximum value strip runs from the upper right to the lower left, but again through the same focus pivot point F (patterns b, d and f of FIG. 3).

The comparison of the charge configurations or structures of a scanning pattern rotated to the left with those configurations or structures of a pattern rotated to the right reduces the ambiguity within the maximum value strips to an unambiguous designation of the focus pivot point F.

In the patterns a and b of FIG. 3 are shown for example the case of a pivot point shifted to the right. Before unambiguous detection of this pivot point, the effects of the scanning patterns must be superimposed so that a resulting charge maximum is produced in the middle of the right-hand field. The superimposition is produced in three successive picture fields. Accordingly, the focus pivot point F in the middle of the picture is shifted perpendicular upwards in patterns c and d of FIG. 3, whereas the focus pivot point coincides with the center point of the picture of the signal electrode in patterns e and f of FIG. 3.

In order to obtain this congruence of focus pivot point and picture center point, the beam alignment corrections are optimized in several four-field cycles. Thus each cycle according to FIG. 2 consists of the following four phases: During the first field period, the signal electrode 2 is normally scanned with optimum focussing adjustment. The resulting video signal level (line d of FIG. 2) is of normal magnitude. During the second field period, the scanning pattern is offset onto the position of the odd-numbered first field by means of a pattern offset pulse illustrated on line d of FIG. 2, which is supplied to the vertical deflection coils 4. Because of the shorter integration time of this pattern, the field signal level that is produced is relatively small. The rotation to the left simultaneously produced (caused by the slight defocussing) generates an additional modulaton in the video signal.

Between the parts of the scanning patterns that cross each other, there accumulates in the meanwhile a charge of the signal electrode 2 in the interlined track that is left out of the scanning pattern. During the third field period, the scanning pattern is not offset and therefore normally scanned. At the same time, the scanning pattern is rotated by slight defocussing in the other direction of rotation, thus to the right, and by means of the vertical magnitude correction pulses shown in line c of FIG. 2 is brought to the same size as the rotated pattern of the second field. As in the second field, there is here produced a relatively smaller video signal level with supplemental modulation on account of the pattern intersections.

In the untouched parts of the interlined (interlaced) track—substantially in the common pivot point of the second and third field—the charge can accumulate for the duration of an additional field. In the fourth field period, the scanning pattern is not offet and the charge pattern which has built up during the previous four field periods is read out with normal focussing. In this operation, the maximum signal level therefore is delivered substantially in the zone in which the pivot point was found. In the signal level distribution in this fourth field, it is thus possible to determine the horizontal and vertical position of the pivot point (see line d of FIG. 2).

The measurement pulse shown in line e of FIG. 2 is provided during this fourth field period to the measurement circuit 12, from which then, after analog-to-digital conversion in the converter 13, a digital measurement value is supplied to the control stage 16. The digital measurement value is now further processed as described above, i.e. the newer positioning value for the horizontal and vertical beam alignment for the next measurement cycle is determined by the control unit in the new measurement value together with the stored measured values and the horizontal and vertical alignment adjustment values of the past cycle. This procedure is repeated until automatic operation repeatedly recognizes the charge maximum during the measurement phase in the fourth field period of the cycle.

Although the invention has been described with respect to a particular illustrative example, it will be recognized that variations and modifications are possible within the inventive concept.

I claim:

1. Method of automatic alignment of the electron beam direction in a television camera tube having means for producing an electron beam scanning pattern on a signal electrode, including the steps of observing said scanning pattern once said electrode is illuminated with diffuse light during variation, on a picture field by picture field basis, of the beam focussing field followed by adjustment of a directional alignment magnetic field until the beam directional error is minimized, further comprising the following method steps:
varying the beam scanning pattern of the signal electrode from picture field to picture field in such a manner that as a result the variations both of said scanning pattern and of said beam focussing field variation, there are produced charge accumulation configurations varying from field to field and each having charge maxima;
evaluating the charge maxima of a plurality of successive picture fields, and
utilizing the evaluation of said charge maxima for adjustment of said directional alignment magnetic field for obtaining minimization of said beam directional error.

2. Method according to claim 1, wherein the signal electrode is scanned with intermittent blanking, each blanking being for the duration of a picture field period.

3. Method according to claim 1, wherein the signal electrode is scanned with intermittent blanking for the length of a line by interrupting the electron beam.

4. Method according to claim 1, wherein the interruption of the electron beam is performed for a plurality of television line sections within one television line.

5. Method according to claim 1, wherein the step of evaluating the charge maxima is performed by measuring the magnitude of the charge maxima, digizing the measurement value thus obtained, storing said measurement value and thereafter comparing said measurement value with a previously stored measurement value similarly obtained, deriving a positioning signal value from said comparison and digitally storing said positioning value, and wherein said positioning value is converted from digital-to-analog form and supplied to means for changing the electron beam alignment for adjusting the beam alignment to direct the deflected position of the beam to the center of a picture area in said signal electrode.

6. Method of automatic alignment of the electron beam direction in a television camera tube having means for producing an electron beam scanning pattern on a signal electrode including the steps of observing said scanning pattern when said electrode is illuminated with diffuse light during variation, on a picture field by picture field basis, of the beam focussing field followed by adjustment of a directional alignment magnetic field until the beam directional error is minimized, further comprising the following method steps:
varying the beam scanning of the signal electrode from picture field to picture field by offsetting alternate picture fields vertically while at the same time altering the beam focussing magnetic field alternately in successive picture fields, to produce charge accumulation configurations which are different in alternate fields, each having charge maxima;
evaluating the disposition of charge maxima in a plurality of successive picture fields for determining the position of a pattern pivot point that coincides with the direction of an undeflected electron beam; and using each determination of said pivot point as a basis for automatically adjusting said directional alignment magnetic field for obtaining minimization of said beam directional error.

7. Method according to claim 6, wherein the step of evaluating charge maxima is performed by normal scanning after blanking the signal electrode by interrupting the electron beam for a picture field period.

8. Method according to claim 6, wherein the step of evaluating the charge maxima is performed by measuring the magnitude of the charge maxima, digitizing the measurement value thus obtained, storing said measurement value and thereafter comparing said measurement value with a previously stored measurement value similarly obtained, deriving a positioning signal value from said comparison and digitally storing said positioning value, and wherein said positioning value is converted from digital-to-analog form and supplied to means for changing the electron beam alignment for adjusting the beam alignment to direct the deflected position of the beam to the center of a picture area in said signal electrode.

* * * * *